United States Patent
Nakano et al.

(10) Patent No.: US 11,680,165 B2
(45) Date of Patent: Jun. 20, 2023

(54) POLYAMIDE RESIN COMPOSITION WITH HIGH FLUIDITY

(71) Applicant: MITSUI CHEMICALS, INC., Tokyo (JP)

(72) Inventors: Hidetake Nakano, Singapore (SG); Tetsuya Nakamura, Sodegaura (JP); Hirokazu Tanaka, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 39 days.

(21) Appl. No.: 17/346,744

(22) Filed: Jun. 14, 2021

(65) Prior Publication Data

US 2021/0301131 A1    Sep. 30, 2021

Related U.S. Application Data

(62) Division of application No. 15/779,938, filed as application No. PCT/JP2016/085400 on Nov. 29, 2016, now Pat. No. 11,034,835.

(30) Foreign Application Priority Data

Dec. 1, 2015    (JP) .............................. JP2015-234534

(51) Int. Cl.
| | | |
|---|---|---|
| C08L 77/00 | (2006.01) | |
| C08L 23/26 | (2006.01) | |
| C08L 77/06 | (2006.01) | |
| C08K 3/00 | (2018.01) | |
| C08K 3/013 | (2018.01) | |

(52) U.S. Cl.
CPC ............... *C08L 77/00* (2013.01); *C08K 3/00* (2013.01); *C08K 3/013* (2018.01); *C08L 23/26* (2013.01); *C08L 77/06* (2013.01)

(58) Field of Classification Search
CPC ........ C08L 23/26; C08L 51/00; C08L 51/003; C08L 51/006; C08L 51/04; C08L 51/06
See application file for complete search history.

(56) References Cited

U.S. PATENT DOCUMENTS

| 5,346,773 A | 9/1994 | Simoens |
| 8,197,715 B2 | 6/2012 | Weber et al. |

| 2010/0009158 A1 | 1/2010 | Imaizumi et al. |
| 2010/0090174 A1 | 4/2010 | Weber et al. |
| 2015/0332802 A1 | 11/2015 | Jeong et al. |

FOREIGN PATENT DOCUMENTS

| EP | 2 275 493 A1 | 1/2011 |
| JP | S55-9662 A | 1/1980 |
| JP | S59-122545 A | 7/1984 |
| JP | S62-13379 B2 | 3/1987 |
| JP | H05-032887 A | 2/1993 |
| JP | H06-228407 A | 8/1994 |
| JP | H07-97513 A | 4/1995 |
| JP | H09-87475 A | 3/1997 |
| JP | 2004-210853 A | 7/2004 |
| JP | 2008-095066 A | 4/2008 |
| JP | 2010-513626 A | 4/2010 |
| JP | 2011-148267 A | 8/2011 |
| JP | 2015-010100 A | 1/2015 |

OTHER PUBLICATIONS

JP 2004-210853 Machine Translation (Jul. 2004).*
International Search Report with English language translation and Written Opinion issued in International Application No. PCT/JP2016/085400 dated Feb. 7, 2017.

* cited by examiner

*Primary Examiner* — Ana L. Woodward
(74) *Attorney, Agent, or Firm* — Foley & Lardner LLP

(57) ABSTRACT

Disclosed is a polyamide resin composition including 50% to 99% by mass of a polyamide (P) and 1% to 50% by mass of an acid-modified polyolefin (Q) satisfying the following requirements (1) to (3). (1) A melt flow rate (MFR) as measured at 230° C. under a load of 2.16 kg is 50 to 200 (g/10 min). (2) An acid modification amount is 0.1% to 2.0% by mass. (3) The acid-modified polyolefin (Q) includes a modified product (q1) of an elastomer including 10% to 95% by mole of an ethylene-derived skeleton unit, 0% to 80% by mole of a propylene-derived skeleton unit, and 3% to 40% by mole of a skeleton unit derived from an α-olefin having 4 to 8 carbon atoms (with a total amount of the ethylene-derived skeleton unit, the propylene-derived skeleton unit, and the skeleton unit derived from an α-olefin being 100% by mole), the elastomer being modified by maleic acid or an anhydride thereof.

4 Claims, No Drawings

POLYAMIDE RESIN COMPOSITION WITH HIGH FLUIDITY

RELATED APPLICATIONS

The present application is a Divisional of U.S. patent application Ser. No. 15/779,938, dated May 30, 2018, which claims priority under 37 U.S.C. § 371 to International Patent Application No. PCT/JP2016/085400, filed Nov. 29, 2016, which claims priority to and the benefit of Japanese Patent Application No. 2015-234534, filed on Dec. 1, 2015. The contents of these applications are hereby incorporated by reference in their entireties.

TECHNICAL FIELD

The present invention relates to a polyamide resin composition, and more specifically to a polyamide resin composition having an excellent balance between impact resistance and specular glossiness or an excellent balance between impact resistance and fluidity during molding of a molded product, and a molded product obtained therefrom.

BACKGROUND ART

A polyamide resin is expected to be greatly demanded as an engineering plastic due to its excellent properties. However, in general, it still cannot be said that the polyamide resin has sufficient mechanical strength such as friction/abrasion resistance, and impact resistance, and various improvements in such performance are investigated. If the impact resistance of the polyamide resin can be improved, the polyamide resin can meet needs in various fields of components of vehicles such as automobiles, common machine components, precision machine components, electronic and electric equipment components, leisure sports goods, and civil engineering and construction members.

As a method for improving impact resistance such as Izod impact strength of a polyamide resin, a method of blending an ethylene/α-olefin copolymer grafted with an α,β-unsaturated carboxylic acid into a polyamide resin has been proposed (Patent documents 1 to 3). However, the present inventors have confirmed that if impact resistance is to be improved in the polyamide resin compositions proposed in these documents, heat resistance typified by a deflection temperature under a constant load is lowered.

In a case where a polyamide resin is used in exterior members for automobiles, such as a door handle, a fender, and a door mirror stay, the materials therefor are required to have high strength/high rigidity, and therefore, a resin which is highly filled with an inorganic filling material such as a glass fiber is injection-molded in many cases. However, if the inorganic filling material is highly filled, a polyamide resin composition is likely to have deteriorated fluidity. As a result, a molded article may have an appearance with the inorganic filling material seemingly floating on the surface thereof or may have a reduced glossiness due to a reduction in mold transfer properties. Further, a weld line is noticeable, by which the weld appearance easily becomes problematic.

Examples of a method for improving the surface appearance of a molded article include a method of using a polyamide resin having a low molecular weight and a method of using a fluidity modifier (plasticizers or waxes). However, since these methods have problems of a reduction of impact strength or generation of gases, silver streaks, or pinholes during molding, they have limitations in applications thereof. Incidentally, a method of obtaining a polyamide resin composition having excellent mechanical strength, moldability, and a surface appearance by using a specific diamine as a diamine component constituting a polyamide is disclosed (Patent documents 4 and 5). However, the effect of this method is not sufficient, yet. In addition, a method in which a homopolypropylene or a specific acid-modified polyolefin is blended into a polyamide resin to obtain a polyamide resin composition having an excellent balance between impact resistance and heat resistance is also disclosed (Patent document 6). However, flexibility or moldability (spiral flowability during injection molding) has not been sufficiently investigated.

Accordingly, there has hitherto been a demand for a polyamide resin composition having excellent moldability (spiral flowability during injection molding) or appearance (surface gloss) as a molded product which does not impair the intrinsic mechanical strength (impact resistance) exhibited by a polyamide resin as much as possible and is provided with flexibility.

RELATED ART DOCUMENTS

Patent Documents

Patent document 1: JP S55-9662 A
Patent document 2: JP S62-13379 A
Patent document 3: JP H09-87475 A
Patent document 4: JP 2008-95066 A
Patent document 5: JP 2011-148267 A
Patent document 6: JP 2015-10100 A

SUMMARY OF INVENTION

Technical Problem

An object of the present invention is to solve the above-mentioned respective problems, that is, to provide a polyamide resin composition which does not impair the intrinsic impact resistance exhibited by a polyamide resin as much as possible and has excellent flexibility or moldability (fluidity during molding).

Solution to Problem

The present invention will be specified by the following aspects.

[1] A polyamide resin composition comprising:
50% to 99% by mass of a polyamide (P); and
1% to 50% by mass of an acid-modified polyolefin (Q) satisfying the following requirements (1) to (3),
(1) a melt flow rate (MFR) as measured at 230° C. under a load of 2.16 kg is 50 to 200 (g/10 min),
(2) an acid modification amount is 0.1% to 2.0% by mass,
(3) the acid-modified polyolefin (Q) includes a modified product (q1) of an elastomer including 10% to 95% by mole of an ethylene-derived skeleton unit, 0% to 80% by mole of a propylene-derived skeleton unit, and 3% to 40% by mole of a skeleton unit derived from an α-olefin having 4 to 8 carbon atoms (with a total amount of the ethylene-derived skeleton unit, the propylene-derived skeleton unit, and the skeleton unit derived from an α-olefin being 100% by mole), the elastomer being modified by maleic acid or an anhydride thereof.

[2] The polyamide resin composition according to [1], wherein the acid-modified polyolefin (Q) includes the following modified products (q1A) and (q2), and the content of the modified product (q2) is 3% to 30% by mass with respect to the acid-modified polyolefin (Q):

a modified product (q1A) of an elastomer including a propylene-derived skeleton unit, the elastomer being modified by maleic acid or an anhydride thereof, as one form of the modified product (q1) and a modified product (q2) of a random polypropylene including equal to or more than 90% by mole of a propylene-derived skeleton unit and equal to or less than 10% by mole of a skeleton unit derived from ethylene or an α-olefin having 4 to 8 carbon atoms, the random polypropylene being modified by maleic acid or an anhydride thereof.

[3] The polyamide resin composition according to [1], wherein the acid-modified polyolefin (Q) includes a modified product (q1B) of an elastomer not including a propylene-derived skeleton unit, and including 75% to 95% by mole of an ethylene-derived skeleton unit and 5% to 25% by mole of a skeleton unit derived from an α-olefin having 4 to 8 carbon atoms, the elastomer being modified by maleic acid or an anhydride thereof, as one form of the modified product (q1).

[4] A filler-containing polyamide resin composition further comprising 1 to 100 parts by mass of an inorganic filler with respect to 100 parts by mass of the polyamide resin composition according to [1].

[5] A molded article comprised of the polyamide resin composition a according to any one of [1] to [3].

[6] A molded article comprised of the filler-containing polyamide resin composition according to [4].

Advantageous Effects of Invention

The polyamide resin composition of the present invention is a polyamide resin composition in which the intrinsic impact resistance exhibited by a polyamide resin is not significantly impaired and excellent flexibility or moldability (fluidity during molding) is provided.

MODES FOR CARRYING OUT THE INVENTION

[Polyamide (P)]

The polyamide (P) used in the present invention is not particularly limited, and various known polyamide resins be used without limitation within a range not impairing the effect of the present invention. For example, an amino acid lactam or a melt-moldable polyamide resin obtained by a polycondensation reaction of a diamine and a dicarboxylic acid can be used. Specific examples of the polyamide (P) include the following resins.

(1) A polycondensate of an organic dicarboxylic acid having 4 to 12 carbon atoms and an organic diamine having 2 to 13 carbon atoms, for example, polyhexamethylene adipamide [6,6 Nylon] which is a polycondensate of hexamethylenediamine and adipic acid, polyhexamethylene azelamide [6,9 Nylon] which is a polycondensate of hexamethylenediamine and azelaic acid, polyhexamethylene sebacamide [6,10 Nylon] which is a polycondensate of hexamethylenediamine and sebacic acid, polyhexamethylene dodecanediamide [6,12 Nylon] which is a polycondensate of hexamethylenediamine and dodecanedioic acid, a semi-aromatic polyamide (PA6T, PA9T, PA10T, PA11T) which is a polycondensate of an aromatic dicarboxylic acid and an aliphatic diamine, and polybis(4-aminocyclohexyl)methanedodecane which is a polycondensate of bis-p-aminocyclohexylmethane and dodecanedioic acid. Specific examples of the organic dicarboxylic acid include adipic acid, pimelic acid, suberic acid, phthalic acid, terephthalic acid, isophthalic acid, naphthalenedicarboxylic acid, phenylenedioxydiacetic acid, oxydibenzoic acid, diphenylmethanedicarboxylic acid, diphenylsulfonedicarboxylic acid, biphenyldicarboxylic acid, sebacic acid, and dodecanedioic acid. Specific examples of the organic diamine include hexamethylenediamine, octamethylenediamine, nonanediamine, octanediamine, decanediamine, undecanediamine, and dodecanediamine.

(2) A polycondensate of an ω-amino acid, for example, polyundecanamide [11 Nylon] which is a polycondensate of ω-aminoundecanoic acid.

(3) A ring-opened polymer of a lactam, for example, polycapramide [6 Nylon] which is a ring-opened polymer of ε-aminocaprolactam, and polylauriclactam [12 Nylon] which is a ring-opened polymer of ε-aminolaurolactam.

Among these, polyhexamethylene adipamide [6,6 Nylon], polyhexamethylene azelamide [6,9 Nylon], and polycapramide [6 Nylon] are preferable.

Incidentally, in the present invention, for example, a polyamide resin which is produced from adipic acid, isophthalic acid, and hexamethylenediamine can be also used, and a blend obtained by blending equal to or more than two polyamide resins, such as a mixture of 6 Nylon and 6,6 Nylon, can be also used.

The melt volume rate (MVR) of the polyamide (P), as measured at 275° C. under a load of 2.16 kg, is preferably 1 to 200 $cm^3/10$ min, more preferably 1 to 150 $cm^3/10$ min, particularly preferably 1 to 125 $cm^3/10$ min. By using such a polyamide (P), there is a tendency that the intrinsic impact resistance exhibited by the polyamide resin is sufficiently expressed, and thus, even in a case of being mixed with the acid-modified polyolefin (Q) having excellent fluidity, the impact resistance is not significantly impaired. As a result, the effect of the present invention, in which the balance between impact resistance and specular glossiness, or the balance between impact resistance and fluidity during molding is excellent, is more noticeable.

[Acid-Modified Polyolefin (Q)]

The acid-modified polyolefin (Q) used in the present invention may satisfy the following requirements (1) to (3).

(1) The melt flow rate (MFR) as measured at 230° C. under a load of 2.16 kg is 50 to 200 (g/10 min), preferably 60 to 190 (g/10 min). By controlling the MFR to be within this range, a polyamide resin molded product having an excellent balance between impact resistance and specular glossiness or an excellent balance between impact resistance and fluidity during molding of a molded product is obtained.

(2) The acid modification amount is 0.1% to 2.0% by mass, preferably 0.1% to 1.0% by mass, more preferably 0.2% to 0.8% by mass. If the acid modification amount is too small, the impact resistance of a molded product is reduced in some cases. On the other hand, if the acid modification amount is too large, a necessity to cope with an increase in the amount of polar monomers or organic peroxides during modification in a common modification method occurs, but foreign materials such as gels may be incorporated into acid-modified polyolefins in some cases in such a modification method.

(3) The acid-modified polyolefin (Q) includes a modified product (q1) of an elastomer including 10% to 95% by mole, preferably 10% to 90% by mole of an ethylene-derived skeleton unit, 0% to 80% by mole of a propylene-derived skeleton unit, and 3% to 40% by mole of a skeleton unit derived from an α-olefin having 4 to 8 carbon atoms (with a total amount of the ethylene-derived skeleton unit, the propylene-derived skeleton unit, and the skeleton unit derived from an α-olefin being 100% by mole), the elastomer being modified by maleic acid or an anhydride thereof. Since the content of the propylene-derived skeleton unit in the elastomer used in the modified product (q1) is 0% to 80% by mole, both of a case where an elastomer including a propylene-derived skeleton unit is used and a case where an elastomer not including such the skeleton unit are encompassed. Further, preferred embodiments of these cases are different from each other.

In a case where the modified product (q1) is a modified product (q1A) of an elastomer including a propylene-derived skeleton unit, the elastomer being modified by maleic acid or an anhydride thereof, it is preferable that the acid-modified polyolefin (Q) includes a modified product (q1A) and a modified product (q2) as described below. Further, the content of the modified product (q2) is preferably 3% to 30% by mass with respect to the acid-modified polyolefin (Q).

A modified product (q1A) of an elastomer including a propylene-derived skeleton unit, the elastomer being modified by maleic acid or an anhydride thereof, as one form of the modified product (q1)

A modified product (q2) of a random polypropylene including equal to or more than 90% by mole of a propylene-derived skeleton unit and equal to or less than 10% by mole of a skeleton unit derived from ethylene or an α-olefin having 4 to 8 carbon atoms, the random polypropylene being modified by maleic acid or an anhydride thereof.

On the other hand, in a case where the modified product (q1) is a modified product of an elastomer not including a propylene-derived skeleton unit, the elastomer being modified by maleic acid or an anhydride thereof, it is preferable that the acid-modified polyolefin (Q) includes a modified product (q1B) of an elastomer not including a propylene-derived skeleton unit, and including 75% to 95% by mole of an ethylene-derived skeleton unit and 5% to 25% by mole of a skeleton unit derived from an α-olefin having 4 to 8 carbon atoms, the elastomer being modified by maleic acid or an anhydride thereof, as one form of the modified product (q1).

Hereinafter, the modified product (q1A), the modified product (q1B), and the modified product (q2) will be described.

[Modified Product (q1A)]

The modified product (q1A) is a modified product (q1) in a case where an elastomer including a propylene-derived skeleton unit is used. The elastomer (r1A) used in the modified product (q1A) preferably satisfies the following requirements (b1) and (b2), more preferably further satisfies the following requirements (b3) to (b5), and is particularly preferably a propylene-based copolymer further satisfying the following requirements (b6) and (b7).

(b1) A melting point as measured by differential scanning calorimetry (DSC) is lower than 120° C., or the melting point is not observed. Preferably, the melting point is equal to or lower than 100° C., or the melting point is not observed. Here, the expression, the melting point is not observed, means that a crystal melting peak with a crystal melting endothermic enthalpy equal to or more than 1 J/g is not observed in the range of −150° C. to 200° C. Further, the melting point is a melting point as detected on a DSC curve obtained by cooling a test piece which has been regulated to be in a state of 23° C.±2° C. for equal to or more than 72 hours to −40° C., and then performing measurement at a heating rate of 10° C./min. It should be noted that this is different from a DSC measurement method for a melting point of random polypropylene which will be described later.

From the viewpoints of the flexibility of the modified product (q1A) and the compatibility with a modified product (q2) of a random polypropylene which will be described later, the elastomer (r1A) before acid modification is a terpolymer of propylene, ethylene, and an α-olefin having 4 to 20 carbon atoms, and preferably satisfies the following requirement (b2).

(b2) It is usually a copolymer which includes 51% to 80% by mole of a propylene-derived structural unit, 10% to 24% by mole of an ethylene-derived structural unit, and 3% to 25% by mole of a structural unit derived from an α-olefin having 4 to 8 carbon atoms, preferably includes 60% to 80% by mole of a propylene-derived structural unit, 10% to 20% by mole of an ethylene-derived structural unit, and 3% to 23% by mole of a structural unit derived from an α-olefin having 4 to 8 carbon atoms, more preferably includes 65% to 80% by mole of a propylene-derived structural unit, 11% to 19% by mole of an ethylene-derived structural unit, and 4% to 21% by mole of a structural unit derived from an α-olefin having 4 to 8 carbon atoms.

As the α-olefin having 4 to 8 carbon atoms, 1-butene, 1-hexene, or 1-octene is preferable, and 1-butene is particularly preferable, from the viewpoint of its availability. The structural unit (% by mole) of each of the comonomers is determined by, for example, the analysis of $^{13}$C-NMR spectrum.

(b3) A Shore A hardness is preferably 20 to 90, more preferably 35 to 60 from the viewpoint of flexibility. The Shore A hardness is a value obtained by heating and melting a sample at 190° C. to 230° C., and then press-molding the sample at a cooling temperature of 15° C. to 25° C. to obtain a test piece, storing the test piece under an environment at 23° C.±2° C. for equal to or more than 72 hours, and reading a scale immediately after an indenter contact using an A type measurement apparatus (in accordance with ASTM D2240).

(b4) A ratio (Mw/Mn) of a weight-average molecular weight (Mw) to a number-average molecular weight (Mn), as measured by gel permeation chromatography (GPC), is preferably 1.2 to 3.5. With such a molecular weight distribution, there is a small fraction of low-molecular-weight components, and therefore, stickiness is suppressed.

(b5) An isotactic triad fraction (mm) is preferably 85% to 99.9%, more preferably 85% to 97.5%, particularly preferably 90% to 97%. If this isotactic triad fraction (mm) is within this range, even in a case where comonomers such as ethylene and 1-butene are significantly copolymerized, the crystallinity is not completely lost, and therefore, the isotactic triad fraction (mm) is suitable from the viewpoint of, for example, mechanical properties. The isotactic triad fraction (mm) can be measured using the method described in International Publication No. 2004/087775 from Page 21 line 7 to Page 26 line 6.

(b6) A glass transition temperature (Tg) is preferably observed to be in the range of −10° C. to −50° C. from the viewpoint of mechanical properties. This Tg can be determined under the condition described in (b1) above, using differential scanning calorimetry (DSC).

(b7) An MFR (ASTM D1238, 230° C., a load of 2.16 kg) is preferably 0.5 to 500 g/10 min, more preferably 1 to 100 g/10 min, from the viewpoint of processability or mechanical properties.

A method for producing the elastomer (r1A) before acid modification is not particularly limited, but the elastomer (r1A) can be produced by the copolymerization of propylene, ethylene and other α-olefins in the presence of a known catalyst capable of tacticity polymerization of olefins with isotactic structures (for example, a catalyst having a solidshaped titanium component and an organic metal compound as a main component, or a metallocene catalyst using a metallocene compound as a component of the catalyst). Preferably, the elastomer (r1A) is obtained by the copolymerization in the presence of the metallocene catalyst. Two kinds of propylene-based polymers (B) used in Examples of the present application which will be described later was prepared in accordance with the method described in International Publication No. 2006/098452, using the metallocene catalyst described in the same publication.

[Modified Product (q1B)]

The modified product (q1B) is a modified product (q1B) of the elastomer (r1B) not including a propylene-derived skeleton unit, and including 75% to 95% by mole, preferably 75% to 90% by mole of an ethylene-derived skeleton unit, and 5% to 25% by mole, preferably 10% to 25% by mole of a skeleton unit derived from an α-olefin having 4 to 8 carbon atoms, the elastomer being modified by maleic acid or an anhydride thereof. Examples of the α-olefin having 4 to 8 carbon atoms include 1-butene, 1-pentene, 1-hexene, 1-heptene, 1-octene, and a combination thereof. Among these, 1-butene, 1-hexene, and 1-octene are particularly preferable.

The content of the α-olefin having 4 to 8 carbon atoms in the elastomer (r1B) before modification is 5% to 25% by mole, preferably 10% to 25% by mole, more preferably 11% to 22% by mole, particularly preferably 12% to 20% by mole. If the content of the α-olefin is within such a range, it is possible to obtain a modified product (q1B) having good flexibility and easy handling. In addition, if this elastomer (r1B) is used, it is possible to obtain a polyamide resin composition capable of providing a molded product having excellent impact resistance and flexibility.

The intrinsic viscosity [η] of the elastomer (r1B) before modification, as measured in decalin at 135° C., is preferably 0.5 to 1.4 dl/g, more preferably 0.7 to 1.4 dl/g. If the intrinsic viscosity [η] is within such a range, the blending properties of the modified product (q1B) and the polyamide (P) are improved. In addition, if the elastomer (r1B) is used, it is possible to obtain a polyamide resin composition having excellent moldability.

The elastomer (r1B) before modification having the characteristics as described above can be prepared by, for example, random copolymerization of ethylene and an α-olefin having 4 to 8 carbon atoms in the presence of a vanadium-based catalyst comprised of a soluble vanadium compound and an alkylaluminum halide compound, or a zirconium-based catalyst comprised of a metallocene compound of zirconium and an organic aluminumoxy compound.

[Modified Product (q2)]

The modified product (q2) is a modified product of a random polypropylene (r-PP) including equal to or more than 90% by mole of a propylene-derived skeleton unit and equal to or less than 10% by mole of a skeleton unit derived from ethylene or an α-olefin having 4 to 8 carbon atoms, the random polypropylene (r-PP) being modified by maleic acid or an anhydride thereof. Since the random polypropylene (r-PP) is used in the modified product (q2), a balance between the impact characteristics and the fluidity during molding of a molded product is further improved, particularly as compared with a case where a modified product of homopolypropylene is used.

Examples of the α-olefin having 4 to 8 carbon atoms include 1-butene, 1-pentene, 3-methyl-1-butene, 1-hexene, 4-methyl-1-pentene, and 1-octene. Among those, 1-butene is preferable. The amount of the skeleton unit derived from ethylene or an α-olefin having 4 to 8 carbon atoms is preferably 0.1% to 8% by mole, more preferably 0.2% to 7.5% by mole.

The melting point (Tm) of the random polypropylene (r-PP), as obtained by differential scanning calorimetry (DSC) measurement, is preferably 120° C. to 170° C., more preferably 125° C. to 168° C. Further, the melting endothermic enthalpy (ΔH) measured simultaneously is preferably equal to or more than 50 mJ/mg. This melting point (Tm) is specifically a value obtained by maintaining a sample at 200° C. for 10 min in a differential scanning calorimetry (DSC) measurement apparatus, then cooling it to −20° C. at a cooling rate of 10° C./min, maintaining it at −20° C. for 1 min, and then measuring the temperature under the condition of a heating rate of 10° C./min again.

The random polypropylene (r-PP) is usually isotactic polypropylene. Isotacticity indicates that the isotactic pentad fraction (mmmm fraction) measured by an NMR method is preferably 90% to 99.8%, more preferably 95% to 99.8%. The mmmm fraction is, for example, a ratio of isotactic sequences in a pentad unit in the molecular chain, as measured using $^{13}$C-NMR, in other words, a fraction of propylene monomer units present in the center of sequences in which five propylene monomer units are continuously mesobonded, as described in JP 2007-186664, and calculated by the measurement method disclosed in the same publication.

The MFR (ASTM D1238, 230° C., a load of 2.16 kg) of the random polypropylene (r-PP) is usually 0.01 to 400 g/10 min, preferably 0.1 to 200 g/10 min, more preferably 0.5 to 100 g/10 min. The random polypropylene (r-PP), in particular, isotactic polypropylene can be produced by various known methods, using a Ziegler/Natta type catalyst or a metallocene catalyst.

[Method for Producing Acid-Modified Polyolefin (Q)]

The acid-modified polyolefin (Q) is obtained by, for example, adding if necessary an additive which will be described later to a blend of the elastomer (r1A) and the random polypropylene (r-PP) described above, or to the elastomer (r1B) described above, and graft-polymerizing the blend or the elastomer with maleic acid or an anhydride thereof in the presence of a radical initiator. The elastomer (r1A) and the random polypropylene (r-PP) may be granulated in advance using a known melt-kneading method.

The amount of the maleic acid or an anhydride thereof to be introduced is usually 0.010 to 15 parts by mass, preferably 0.010 to 5.0 parts by mass, with respect to 100 parts by mass of the polyolefin before modification. The amount of the radical initiator to be used is usually 0.0010 to 1.0 parts by mass, preferably 0.0010 to 0.30 parts by mass, with respect to 100 parts by mass of the polyolefin before modification.

As the radical initiator, for example, an organic peroxide, an azo compound or a metal hydride can be used. The radical initiator may be used after being mixed with maleic acid or an anhydride thereof, and the polyolefin before modification or other components, but can also be used after being dissolved in a small amount of an organic solvent. This organic solvent is not particularly limited as long as it is an organic solvent capable of dissolving a radical initiator.

The graft modification with maleic acid or an anhydride thereof can be carried out by a method known in the related art. Examples thereof include a method in which a propylene-based polyamide resin composition is dissolved in an organic solvent, then maleic acid or an anhydride thereof and, for example, a radical initiator are added to the solution, and the mixture is reacted at a temperature of 70° C. to 200° C., preferably 80° C. to 190° C., for 0.5 to 15 hours, preferably 1 to 10 hours.

Furthermore, an acid-modified product can also be prepared by reacting maleic acid or an anhydride thereof with a polyolefin before modification in the presence of a radical initiator without a solvent, using an extractor. It is desired that this reaction be performed usually at a temperature equal to or higher than the melting point of the polyolefin before modification, usually for 0.5 to 10 min.

[Polyamide Resin Composition]

The polyamide resin composition of the present invention is obtained by using 50% to 99% by mass of the polyamide (P) and 1% to 50% by mass of the acid-modified polyolefin (Q), preferably 60% to 98% by mass of the polyamide (P) and 2% to 40% by mass of the acid-modified polyolefin (Q), more preferably 70% to 98% by mass of the polyamide (P) and 2% to 30% by mass of the acid-modified polyolefin (Q), particularly preferably 75% to 98% by mass of the polyamide (P) and 2% to 25% by mass of the acid-modified polyolefin (Q) [provided that the total of the component (P) and the component (Q) is 100% by mass] at the respective proportions. By using the polyamide (P) and the acid-modified polyolefin (Q) at these proportions, a molded product having an excellent balance between impact resistance and fluidity during molding is provided. In addition, the moldability is also excellent.

Moreover, the polyamide resin composition of the present invention has relatively low melt viscosity η1 in a low shear rate γ1=12.16 (1/s) and low melt viscosity η2 in a high shear rate γ2=1216 (1/s), as shown in Examples which will be described later. Furthermore, a ratio X (=η1/η2) of η1 to η2, that is, the reduction ratio of the melt viscosity in a case where the shear rate is increased is relatively high. Accordingly, the polyamide resin composition of the present invention is excellent in fluidity, and at the same time useful in particular in molding under the condition of a high shear rate (for example, molding with a high molding rate and a short molding cycle). Further, since there is no case where the melt viscosity η1 at a low shear rate is too low, for example, it is difficult for a problem of cobwebbing at a nozzle section during injection molding to occur, leading to a high yield.

The polyamide resin composition of the present invention is prepared by, for example, melt-mixing a polyamide (P), an acid-modified polyolefin (Q), and an additive to be added, as desired, by various methods known in the related art. Specifically, the polyamide resin composition is obtained by charging the respective components simultaneously or sequentially into a mixing device such as a Henschel mixer, a V type blender, a tumbler mixer, and a ribbon blender, mixing them, and melt-kneading the mixture using, for example, a single-screw extruder, a multi-screw extruder, a kneader or a Banbury mixer. In particular, if a device having excellent kneading performance, such as a multi-screw extruder, a kneader, and a Banbury mixer is used, a high-quality polyamide resin composition in which the respective components are more uniformly dispersed is obtained. In addition, other additives, for example, an antioxidant, can also be added thereto, as desired, in an arbitrary step in these processes.

[Other Additives]

The polyamide resin composition of the present invention may include, in addition to the polyamide (P) and the acid-modified polyolefin (Q), usually 0.01 to 10 parts by mass, preferably 0.1 to 5 parts by mass of additives such as other synthetic resins, other rubbers, an antioxidant, a heat-resistant stabilizer, a weathering stabilizer, a slipping agent, an anti-blocking agent, a crystal nucleating agent, a pigment, a hydrochloric acid absorber, and a copper inhibitor, with respect to 100 parts by mass of the polyamide resin composition, as desired, within a range not impairing the purpose of the present invention. These additives may be added in a step of preparing the polyamide resin composition, or may also be added before, during, or after the preparation of the acid-modified polyolefin (Q).

In addition, the polyamide resin composition may also be a filler-containing polyamide resin composition which further includes an inorganic filler in a proportion of usually 1 to 100 parts by mass, preferably 5 to 80 parts by mass, more preferably 10 to 70 parts by mass, with respect to 100 parts by mass of the polyamide resin composition. Such a filler-containing polyamide resin composition is useful in cases where it is intended to further improve the mechanical strength of a molded product, or in applications in which a molded product having an adjusted linear expansion coefficient (molding shrinkage rate) is required.

Examples of the filler include fillers such as a fibrous filler, a granular filler, and a plate-like filler. Specific examples of the fibrous filler include glass fiber, carbon fiber, and aramid fiber, and suitable examples of the glass fiber include a chopped strand having an average fiber diameter of 6 to 14 µm. Specific examples of the granular or plate-like filler include calcium carbonate, mica, glass flake, glass balloon, magnesium carbonate, silica, talc, clay, and a pulverized material of carbon fibers or aramid fibers.

Even in a case where a filler is not included, strong adherence is attained, and a very strong force is required to remove a resin molded product adhered to a metal. However, if a molded composite is subjected to a temperature cycle test, an adhesive strength is rapidly reduced by repeating cycles in a system of a resin not containing a filler. One of the reasons therefor is that there is a big difference in linear expansion coefficients of between a metal-shaped substance and a thermoplastic synthetic resin composition. For example, the linear expansion coefficient of an aluminum alloy is rather greater in the metals, but is still considerably smaller than that of the thermoplastic synthetic resin. The presence of the filler lowers the linear expansion coefficient of the thermoplastic synthetic resin composition, and the linear expansion coefficient of the aluminum alloy is set to be closer to about $2.5 \times 10^{-5}$° $C.^{-1}$.

EXAMPLES

Hereinafter, the present invention will be described in more details with reference to Examples, but the present invention is not limited to these Examples. The components as raw materials used in Examples and Comparative Examples are as follows.

Polyamide (P)

"PA66": 6,6 Nylon (DuPont Co., Zytel (registered trademark) 101L, a melt temperature of 263° C., a Vicat softening temperature of 238° C., a density of 1,140 kg/m$^3$, an MVR of 80 cm$^3$/10 min). The melt volume rate (MVR) of PA66 was measured under the conditions of 275° C. and a load of 2.16 kg in accordance with ASTM D1238.

Random Polypropylene (r2)

"r-PP": Random polypropylene (an ethylene content of 3.0% by mole, a 1-butene content of 1.0% by mole, an MFR (230° C.) of 7 g/10 min, a melting point of 140° C.)

Elastomer (r1A) Before Acid Modification

A propylene/ethylene/butene copolymer (PBER (r1A)) was prepared in accordance with the method disclosed in International Publication No. 2006/98452. The properties of the resins were as follows. A content of a propylene-derived skeleton of 68% by mole, a content of an ethylene-derived skeleton of 13% by mole, a content of a 1-butene-derived skeleton of 19% by mole, mm of 92%, an MFR of 7 (g/10 min), Mw/Mn of 2.1, a Tg of −29° C.

Elastomer (r1B) Before Acid Modification

Three kinds of ethylene/1-butene copolymers (EBR), (r1B-1) to (r1B-3), manufactured by Mitsui Chemicals, Inc. were used. Further, only the acid-modified product of EBR (r1B-1) was used in Examples, and the acid-modified products of the other EBR (r1B-2) and (r1B-3) were used in Comparative Examples. The properties of four kinds of the ethylene/1-butene copolymers were as follows.

(r1B-1) Ethylene content of 85% by mole, MFR (230° C.) of 55 g/10 min (r1B-2) Ethylene content of 85% by mole, MFR (230° C.) of 3.0 g/10 min (r1B-3) Ethylene content of 81% by mole, MFR (230° C.) of 1.5 g/10 min Methods for measuring various properties of the acid-modified polyolefin (Q) are as follows.

(Preparation of Press Sheet for Measurement)

Using a hydraulic hot press machine manufactured by SHINTO Metal Industries Corporation, set at 200° C., pressure sheets were molded at 10 MPa. In a case of sheets having a thickness of 0.5 to 3 mm (spacer shape: 80×80×0.5 to 3 mm on a plate in 240×240×2 mm thick, four sheets), the sheets were kept with the remaining heat for about 5 to 7 min, pressurized at 10 MPa for 1 to 2 min, then compressed at 10 MPa using another hydraulic hot press machine manufactured by SHINTO Metal Industries Corporation, set at 20° C., and cooled for 5 min to prepare samples for measurement. As a hot plate, a brass plate having a thickness of 5 mm was used. A sample manufactured by the above method was used as a sample for evaluation of various properties.

(Shore A Hardness)

This was measured in accordance with ASTM D2240.

(MFR)

A melt flow rate (MFR) was measured under the conditions of 230° C. and a load of 2.16 kg.

[Preparation of Acid-Modified Polyolefin (Q)]

Methods for preparing the acid-modified polyolefins (Q-1) and (Q-2) used in Example and the graft-modified resins (Q-1') to (Q-3') used in Comparative Examples are shown below.

(Method for Preparing Q-1)

10 kg of a polypropylene-based composition (C-1) comprised of 20% by mass of r-PP and 80% by mass of PBER (r1A-1), and a solution having 60 g of maleic anhydride (MAH) and 15 g of 2,5-dimethyl-2,5-di-(t-butylperoxy)-3-hexyne (trade name PERHEXA 25B) dissolved in acetone were blended. Then, the obtained blend was introduced into a hopper of a twin-screw extruder having a screw diameter of 30 mm and L/D=40, and extruded into a strand shape at a resin temperature of 200° C., a screw rotation speed of 240 rpm, and a discharge rate of 12 kg/hr. The obtained strand was sufficiently cooled and then granulated to obtain an acid-modified polyolefin (Q-1). The results of the properties of the obtained acid-modified polyolefin (Q-1) are shown in Table 1. Incidentally, the degree of modification (maleic anhydride content, denoted as MAH (wt %) in Table 1) of the acid-modified polyolefin (Q) was determined from a calibration curve separately prepared, based on a peak intensity with a wavenumber of 1,780 $cm^{-1}$ attributed to carbonyl groups in FT-IR.

(Method for Preparing Q-2)

An acid-modified polyolefin (Q-2) was obtained in the same manner as in the method for preparing Q-1, except that an ethylene/1-butene copolymer (r1B-1) was used instead of the polypropylene-based composition (C-1). The results of the properties of the obtained (Q-2) are shown in Table 1.

(Method for Preparing Q-1')

An impact resistance modifier (Q-1') was obtained in the same manner as in the method for preparing Q-1, except that an ethylene/1-butene copolymer (r1B-2) was used instead of the polypropylene-based composition (C-1), and that the blending ratio was changed to one shown in Table 1. The results of the properties of the obtained (Q-1') are shown in Table 1.

(Method for Preparing Q-2')

An impact resistance modifier (Q-2') was obtained in the same manner as in the method for preparing Q-1, except that an ethylene/1-butene copolymer (r1B-3) was used instead of the polypropylene-based composition (C-1), and that the blending ratio was changed to one shown in Table 1. The results of the properties of the obtained (Q-2') are shown in Table 1.

(Method for Preparing Q-3')

An impact resistance modifier (Q-3') was obtained in the same manner as in the method for preparing Q-1, except that an ethylene/1-butene copolymer (r1B-3) was used instead of the polypropylene-based composition (C-1), and that the blending ratio was changed to one shown in Table 1. The results of the properties of the obtained (Q-3') are shown in Table 1.

TABLE 1

| | | | Q-1 | Q-2 | Q-1' | Q-2' | Q-3' |
|---|---|---|---|---|---|---|---|
| Blending | r-PP | wt % | 20 | | | | |
| | PEBR (r1A-1) | wt % | 80 | | | | |
| | EBR (r1B-1) | wt % | | 100 | | | |
| | EBR (r1B-2) | wt % | | | 100 | | |
| | EBR (r1B-3) | wt % | | | | 100 | 100 |
| | MAH | wt % | 0.60 | 0.60 | 1.00 | 1.20 | 2.40 |
| | PERHEXA 25B | wt % | 0.15 | 0.15 | 0.25 | 0.30 | 0.60 |
| Properties | Degree of modification | % | 0.5 | 0.5 | 0.8 | 1.0 | 2.0 |
| | Hardness Shore A | — | — | 74 | 72 | 72 | 55 | 63 |
| | MFR (230° C.) | g/10 min | 180 | 70 | 3.0 | 1.2 | 1.1 |
| | Density | kg/m³ | 869 | 872 | 872 | 866 | 870 |

Example 1

80 parts by mass of 66 Nylon [manufactured by E.I. du Pont, trade name ZYTEL 101L] and 20 parts by mass of an acid-modified polyolefin (Q-1) were mixed using a Henschel mixer to prepare a dry blend. Subsequently, this dry blend was supplied to a twin-screw extruder (L/D=40, 30 mmφ) set at 245° C. to prepare a pellet of a polyamide resin composition. The obtained pellet of the polyamide resin composition was dried at 80° C. for the whole day and night and then injection-molded under the following conditions to prepare a specimen for testing the properties.

(Injection-Molding Conditions)

Cylinder temperature: 245° C.

Injection pressure: 400 kg/cm$^2$

Mold temperature: 80° C.

Subsequently, evaluation of the properties of the polyamide resin composition was carried out by the following method. The results are shown in Table 2.

(1) Tensile Test

A yield strength and an elongation at break were measured in accordance with ASTM D638, using a specimen having a thickness of ⅛". Further, adjustment of the state of the specimen was performed at a temperature of 23° C. in the dried state for 2 days.

(2) Bending Test

A bending elastic modulus (FM; kg/cm$^2$) was measured in accordance with ASTM D790, using a specimen having a thickness of ⅛". Further, adjustment of the state of the specimen was performed at a temperature of 23° C. in the dried state for 2 days.

(3) Izod Impact Test

A notched Izod impact strength was measured at 23° C. in accordance with ASTM D256, using a specimen having a thickness of ⅛".

(4) Fluidity

Injection molding was carried out with a mold having a groove in a 3.8-mmφ semicircular spiral shape, using an injection molding machine at a mold clamping force of 50 t, set to a cylinder temperature of 280° C., an injection pressure of 100 MPa, and a mold temperature of 80° C., and a flow distance was measured.

(5) Appearance (Gloss)

A square plate of 100 mm×100 mm, having a thickness of 3 mm, was molded using an injection molding machine at a mold clamping force of 70 t, set to a cylinder temperature of 280° C., an injection pressure of 80 MPa, and a mold temperature of 80° C., and a 60° specular glossiness was measured in accordance with JIS Z8741.

(6) Melt Viscosity

The melt viscosity of the polyamide composition was measured using a capillary rheometer (Capillograph 1B) manufactured by Toyo Seiki Seisaku-Sho, Ltd. The shape of an orifice used for the measurement was D=1 mm and L/D=30, and the temperature of a barrel was set to 290° C. After a pellet of the polyamide composition was put into a barrel and retained for 6 min, and then a piston was pushed at a predetermined speed. By changing the pushing speed of the piston, the melt viscosities at a low shear rate γ1=12.16 (1/s) and a high shear rate γ2=1216 (1/s) were defined as η1 and η2, respectively. Further, a ratio X (=η1/η2) of η1 to η2 was calculated.

Example 2

A polyamide resin composition was prepared in the same manner as in Example 1 except that 80 parts by mass of 66 Nylon and 20 parts by mass of the acid-modified polyolefin (Q-1) were used. The results are shown in Table 2.

Example 3

A polyamide resin composition was prepared in the same manner as in Example 1 except that the acid-modified polyolefin (Q-2) was used instead of the acid-modified polyolefin (Q-1). The results are shown in Table 2.

Example 4

A polyamide resin composition was prepared in the same manner as in Example 1 except that 80 parts by mass of 66 Nylon and 20 parts by mass of the acid-modified polyolefin (Q-2) were used. The results are shown in Table 2.

Comparative Examples 1 to 7

A polyamide resin composition was prepared in the same manner as in Example 1 except that the respective components described in Table 3 were used. The results are shown in Table 3.

TABLE 2

| | | | Example 1 | Example 2 | Example 3 | Example 4 |
|---|---|---|---|---|---|---|
| Blending | PA66 | wt % | 90 | 80 | 90 | 80 |
| | Q-1 | wt % | 10 | 20 | | |
| | Q-2 | wt % | | | 10 | 20 |
| | Q-1' | wt % | | | | |
| | Q-2' | wt % | | | | |
| | Q-3' | wt % | | | | |
| Tensile characteristics | Yield strength | MPa | 74 | 58 | 73 | 88 |
| | Elongation | % | 22 | 62 | 15 | 29 |
| Bending characteristics | Elastic modulus | MPa | 2520 | 1840 | 2490 | 1850 |
| Impact resistance | 23° C. Izod | J/m | 121 | 617 | 123 | 574 |
| Fluidity | Spiral flow | cm | 59 | 49 | 63 | 44 |
| | Gloss | 60° JIS Z8741 % | 90 | 69 | 92 | 67 |
| Melt viscosity | η1 = η (γ1 = 12.16 (1/s)) | 290° C. Pas | 720 | 1240 | 1430 | 2470 |
| | η2 = η (γ2 = 1216 (1/s)) | 290° C. Pas | 125 | 90 | 270 | 270 |
| | X = η1/η2 | 290° C. | — | 5.8 | 13.8 | 5.3 | 9.1 |

TABLE 3

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Blending | PA66 | wt % | 100 | 90 | 90 | 90 | 80 | 80 | 80 |
| | Q-1 | wt % | | | | | | | |
| | Q-2 | wt % | | | | | | | |
| | Q-1' | wt % | | 10 | | | 20 | | |
| | Q-2' | wt % | | | 10 | | | 20 | |
| | Q-3' | wt % | | | | 10 | | | 20 |
| Tensile characteristics | Yield strength | MPa | 88 | 69 | 68 | 66 | 51 | 50 | 52 |
| | Elongation | % | 29 | 36 | 66 | 68 | 40 | 56 | 77 |
| Bending characteristics | Elastic modulus | MPa | 2900 | 2350 | 2310 | 2170 | 1790 | 1740 | 1610 |
| Impact resistance | 23° C. Izod | J/m | 58 | 189 | 258 | 275 | 975 | 1030 | 1020 |
| Fluidity | Spiral flow | cm | 49 | 46 | 43 | 41 | 39 | 37 | 35 |
| Gloss | 60° JIS Z8741 | % | 97 | 65 | 49 | 45 | 50 | 41 | 35 |
| Melt viscosity | $\eta 1 = \eta$ ($\gamma 1 = 12.16$ (1/s)) | 290° C. Pas | 720 | 1300 | 1740 | 3200 | 2600 | 2840 | 2640 |
| | $\eta 2 = \eta$ ($\gamma 2 = 1216$ (1/s)) | 290° C. Pas | 160 | 290 | 390 | 740 | 350 | 420 | 480 |
| | $X = \eta 1/\eta 2$ | 290° C. — | — | 4.5 | 4.5 | 4.5 | 4.3 | 7.4 | 6.8 | 5.5 |

INDUSTRIAL APPLICABILITY

The polyamide resin composition of the present invention has an excellent balance between impact resistance and fluidity during molding, and therefore, it has high industrial applicability as an engineering plastic in various fields in which such excellent properties are required for resin materials.

The invention claimed is:

1. A polyamide resin composition comprising:
50% to 99% by mass of a polyamide (P); and
1% to 50% by mass of an acid-modified polyolefin (Q) satisfying the following requirements (1) to (3) [provided that the total of the component (P) and the component (Q) is 100% by mass],
  (1) a melt flow rate (MFR) as measured at 230 C under a load of 2.16 kg is 70 to 200 (g/10 min),
  (2) an acid modification amount by maleic acid or an anhydride thereof is 0.1% to 2.0% by mass,
  (3) the acid-modified polyolefin (Q) includes a modified product (q1B) of an elastomer not including a propylene-derived skeleton unit, and including 75% to 95% by mole of an ethylene-derived skeleton unit and 5% to 25% by mole of a skeleton unit derived from an α-olefin having 4 to 8 carbon atoms, the elastomer being modified by maleic acid or an anhydride thereof.

2. A filler-containing polyamide resin composition further comprising 1 to 100 parts by mass of an inorganic filler with respect to 100 parts by mass of the polyamide resin composition according to claim 1.

3. A molded article comprised of the polyamide resin composition according to claim 1.

4. A molded article comprised of the filler-containing polyamide resin composition according to claim 2.

* * * * *